March 11, 1969

W. H. GROLL 3,432,183

ADJUSTABLE LAWNMOWER GUARD

Filed Oct. 24, 1967

INVENTOR.
WALTER H. GROLL
BY
*George Raymorell*
HIS ATTORNEY

United States Patent Office 3,432,183
Patented Mar. 11, 1969

3,432,183
ADJUSTABLE LAWNMOWER GUARD
Walter H. Groll, Pittsburgh, Pa.
Filed Oct. 24, 1967, Ser. No. 677,639
U.S. Cl. 280—150
Int. Cl. B60r 21/14, 21/00
3 Claims

ABSTRACT OF THE DISCLOSURE

A guard for a rotary lawnmower is provided which may be attached to the lawnmower without disassembly or modification of the lawnmower in any way. The guard is formed of sheet metal with interleaved parts which frictionally engage each other. The frictional engagement of the interleaved parts permits the width of the lawnmower guard to be adjusted. A guard is supported by the axles of the lawnmower and pivots about the axle. Gravity maintains the guard in contact with the ground to prevent the operator of the lawnmower from getting his feet or hands into the blade of the lawnmower.

Background of the invention

The recent widespread use of the rotary lawnmowers in which a blade on a vertical shaft is rotated in a horizontal plane at high speed to cut grass and foliage has resulted in many accidents which occur because of the operators of the lawnmowers inadvertently place their hands or feet in a position where they are struck by the rotating blade. Many attempts have been made to provide guards for the rotating blades which would prevent people from coming into contact with the rotating blade. In most instances, the guards have been relatively heavy, complicated devices which had to be installed upon the lawnmower itself during manufacture or assembly of the lawnmower.

Because most manufacturers hesitate to build a guard onto the lawnmower, which guard increases the price of the lawnmower and gives the impression that the lawnmower may be dangerous to use, thereby reducing the potential saleability of the lawnmower, guards have not been popular. No guard, until the present invention, has been designed and manufactured to be attached to the lawnmowers in the hands of users in a simple and efficient manner.

Because of the various sizes and configurations of commercially manufactured rotary lawnmowers, a guard which will fit most of the models and still be easily installed, lightweight, and effective has not been developed prior to this time. The present invention is directed to a lawnmower guard which solves the problems of weight, installation, and efficiency on lawnmowers in the hands of users.

Summary

The present invention is directed to a novel, lightweight, efficient lawnmower guard which may be installed upon nearly every make and model of rotary lawnmower presently on the market. The lawnmower guard of the present invention is formed from sheet metal of a relatively lightweight gauge.

The lawnmower guard of the present invention has a body unit which is formed of interleaved portions of sheet metal. The sheet metal is formed so that there is a large area of frictional contact between the two halves of the guard. The two sheet metal halves of the body unit may then be positioned relative to each other so that the overall width of the body unit may accommodate any one of a number of sizes of lawnmowers. The body unit has support arms which are connected to it and which connect, in turn, to the axles of the lawnmower. The support arms permit the body unit to pivot about the axles of the lawnmower.

The support arms are formed with axle receiving slots therein so that they may be positioned over the axles without removal of the wheels or disassembly of the lawnmower. The support arms are connected to the body unit in a removable fashion so that the entire lawnmower guard may be packaged in a relatively flat, compact package for sale over the shelf in hardware and variety stores.

With the foregoing considerations in mind, it is an object of the present invention to provide an improved lawnmower guard.

Another object of the present invention is to provide a lawnmower guard which may be readily attached to a rotary power lawnmower.

Another object of the present invention is to provide a lawnmower guard which is maintained in contact with the ground by the action of gravity.

Another object of the present invention is to provide a light weight lawnmower guard which is formed essentially of sheet metal.

Another object of the present invention is to provide a lawnmower guard which may be installed upon a rotary power lawnmower without disassembly or modification of the power lawnmower in any way.

These and other objects of the present invention will become apparent as this description proceeds in conjunction with the accompanying drawings.

Figure 1:
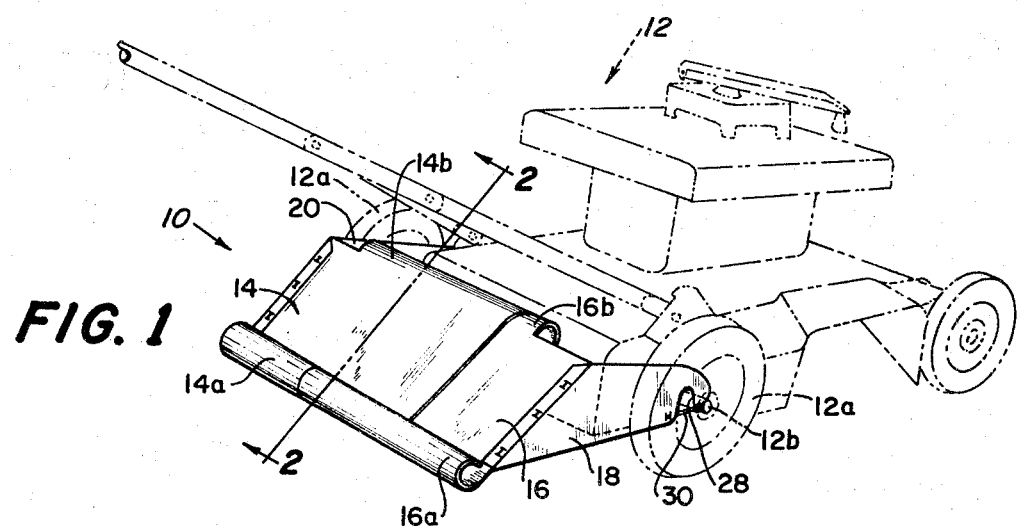
FIGURE 1 is a perspective view of the lawnmower guard of the present invention shown installed upon a rotary power lawnmower indicated in phantom outline.

Referring to the drawings, there is shown a lawnmower guard indicated generally at 10 installed upon a rotary power lawnmower 12 shown in phantom. The rotary power lawnmower 12 is supported on wheels 12a that are, in turn, supported by axles 12b.

The lawnmower guard 10 has a first body member 14 and a second body member 16 which, together, form the body unit. The first body member 14 has a curled portion 14a at the bottom thereof which forms a bumper. The top portion 14b of the body member is curled in the opposite direction. Likewise, the second body member 16 has a curled bottom portion 16a forming a bumper and a curved portion 16b at the top in a manner similar to the body member 14.

Figure 2:
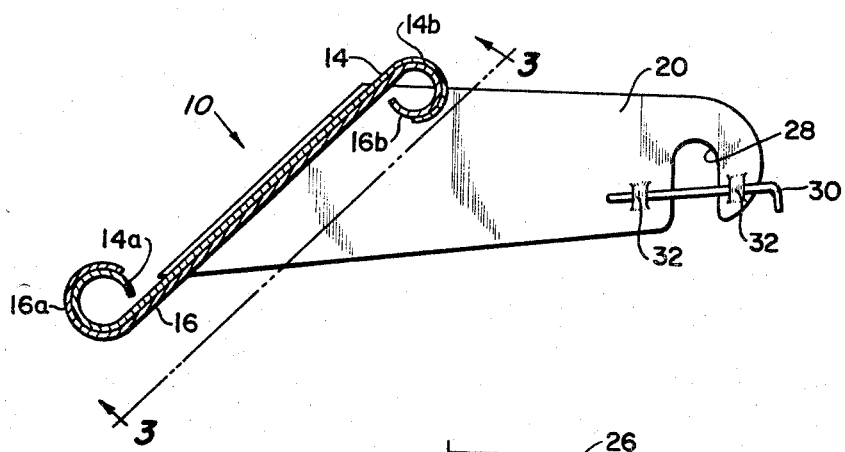
FIGURE 2 is a sectional view taken along line 2—2 of FIGURE 1.

As best seen in FIGURE 2, the cross sectional view of the body members 14 and 16 show that they are formed in the shape of an elongated "S" so that there is a large amount of frictional surface engagement between the body members 14 and 16. It will be seen that the body members 14 and 16 can be moved relative to each other so that the overall length of the body unit may be adjusted to accommodate the particular size lawnmower upon which the guard 10 is to be installed.

The lawnmower guard 10 has support arms 18 and 20 fixed thereto. The support arms 18 and 20 are removably attached to the body members 16 and 14, respectively.

Figure 3:
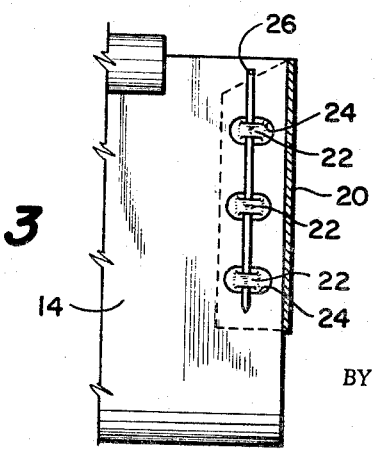
FIGURE 3 is a sectional view taken along line 3—3 of FIGURE 2.

FIGURE 3 shows the form of eyelet and hole connection between the support arm 20 and the body member 14. The support arms 20 has a series of eyelets 22 formed thereon which protrude above the surface of the support arm 20. The eyelets are so spaced that they pass through holes 24 formed in the body member 14 when the support arm 20 is positioned contiguously to the body member 14.

With the eyelets 22 protruding through the holes 24, a pin 26 is inserted through the eyelets to fasten the support arm 20 to the body member 14. In a like manner, the support arm 18 is fastened to the body member 16.

Each support arm 18 and 20 has an axle receiving slot 28 formed therein. The axle receiving slot 28 is near one end of the support arm 20 and permits the support arm 20 to be placed over the axle of the lawnmower as shown in FIGURE 1. A lock pin 30 is provided which may be inserted in eyelets 32 to restrain the axle within the axle receiving slot 28.

It may be seen that the parts of the lawnmower guard, when the support arms 18 and 20 are removed from the body unit, may be stored in a relatively flat, compact package. To install the lawnmower guard 10 upon a lawnmower 12 the support arms 18 and 20 are fastened to the body members 16 and 14, respectively, by the use of pin 26 as has been described.

After the support arms 18 and 20 have been installed upon the body unit, the overall length of the body unit is adjusted by moving body member 14 relative to body member 16 so that the distance between the support arms 18 and 20 permits the support arms to be placed between the wheels 12a of the lawnmower and the respective body wall of the lawnmower. With the support arms so positioned, the axles 12b of the lawnmower enter into the axle receiving slots 28 of the support arms 18 and 20. The lock pins 30 are then inserted into eyelets 22 to complete assembly of the lawnmower guard onto the lawnmower.

Because the support arms 18 and 20 pivot over axles 12b, the force of gravity keeps the body members 14 and 16 in contact with the ground. The bumper formed by the curved portions 14a and 16a of body members 14 and 16 remains in contact with the ground over rough terrain or even if the wheels of the lawnmower are lifted from the ground. In this manner, the back portion of the lawnmower is kept from permitting the hands or feet of the operator to be admitted therefrom.

Although the guard 10 of the present invention is shown installed on the rear wheels of a rotary lawnmower 12, it will be appreciated that the guard could also be installed on the front of the lawnmower in a similar manner. Thus, a guard can be placed on either end of the lawnmower if desired, although the more critical area, of course, is the rear of the lawnmower.

According to the provisions of the patent statutes, I have explained the principle, preferred construction, and mode of operation of my invention, and have illustrated and described what I now consider to represent its best embodiments. However, I desire to have it understood that, within the scope of the appended claims, the invention may be practiced otherwise than as specifically illustrated and described.

I claim:
1. A guard for a power lawnmower having at least two ground contacting wheels positioned on opposite sides of said mower and supported on axle means, said guard having no moving part when said mower is being operated and comprising:
   (a) an extendable body unit formed of sheet material having first and second body members each formed to have an adapted S-shaped cross section to frictionally interleave with each other so that the overall width of said body unit may be adjusted; and so that the rounded portion of said S-shaped cross-section engages the ground to facilitate sliding of said guards;
   (b) support means on each of said first and second body members to connect said body unit to said axle means and support said body unit in spaced relation to said mower; and
   (c) axle receiving means having a slotted portion formed on said support means so that said slotted portion may be positioned over said axle means without removing said wheels and pin means to retain said support means over said axle, said axle receiving means permitting free rotation of said support means about said axle means.

2. The guard of claim 1 wherein said support means are formed of sheet metal and are removably connected to said body members.

3. The guard of claim 1 wherein said body unit contacts the ground by pivoting about said axle means in all normal cutting positions of said mower.

References Cited

UNITED STATES PATENTS

| 994,374 | 6/1911 | Childs | 280—503 |
| 1,572,914 | 2/1926 | Fleming | 280—503 |
| 3,106,812 | 10/1963 | McDonagh | 56—25.4 |

LEO FRIAGLIA, Primary Examiner.

ROBERT R. SONG, Assistant Examiner.

U.S. Cl. X.R.

56—25.4